(12) United States Patent
Ye et al.

(10) Patent No.: US 11,137,520 B2
(45) Date of Patent: Oct. 5, 2021

(54) INTEGRATED DEPTH SENSOR WINDOW LENS AND METHOD

(71) Applicant: Microsoft Technology Licensing, LLC, Redmond, WA (US)

(72) Inventors: Maosheng Ye, Fremont, CA (US); Javier Yanez, Lafayette, CO (US); Frank C. Holloway, Loveland, CO (US); Michael Beerman, Mill Valley, CA (US); Roy Joseph Riccomini, Mt. View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 183 days.

(21) Appl. No.: 16/381,862

(22) Filed: Apr. 11, 2019

(65) Prior Publication Data

US 2020/0271828 A1  Aug. 27, 2020

Related U.S. Application Data

(60) Provisional application No. 62/809,537, filed on Feb. 22, 2019.

(51) Int. Cl.
*G02B 1/00* (2006.01)
*G02B 27/01* (2006.01)
(Continued)

(52) U.S. Cl.
CPC ............ *G02B 1/041* (2013.01); *B29C 45/162* (2013.01); *B29D 11/00403* (2013.01);
(Continued)

(58) Field of Classification Search
CPC ............................ B29K 2069/00; C08L 69/00
See application file for complete search history.

(56) References Cited

U.S. PATENT DOCUMENTS 3,211,811 A * 10/1965 Lanman ........... B29D 11/00413
264/2.3
9,081,210 B2  7/2015 Adams et al.
(Continued)

FOREIGN PATENT DOCUMENTS

AU        2015274283 A1    1/2017
CN          103400836  *   8/2013  .............. G01V 8/12
(Continued)

OTHER PUBLICATIONS

CN-103400836 (Bainian) Aug. 2008 (online machine translation), [Retrieved on Feb. 1, 2020], Retrieved from: Google Patents (Year: 2013).*
(Continued)

*Primary Examiner* — Alison L Hindenlang
*Assistant Examiner* — Andrés E. Behrens, Jr.
(74) *Attorney, Agent, or Firm* — Holzer Patel Drennan

(57) ABSTRACT

A method of making an integrated depth sensor window lens, such as for an augmented reality (AR) head set, the depth sensor window lens comprising a sensor lens and an illuminator lens separated by an opaque dam. The method uses a two-shot injection molding process, a first shot comprising an optically clear polymeric material to form the sensor lens and the illuminator lens and the second shot comprising an opaque polymeric material to form the separator of the two.

12 Claims, 9 Drawing Sheets

(51) Int. Cl.
*G01S 7/481* (2006.01)
*B29D 11/00* (2006.01)
*G02B 1/04* (2006.01)
*B29C 45/16* (2006.01)
G02B 27/00 (2006.01)
B29K 69/00 (2006.01)

(52) U.S. Cl.
CPC ...... *B29D 11/00865* (2013.01); *G01S 7/4811* (2013.01); *G02B 27/0101* (2013.01); B29K 2069/00 (2013.01); B29K 2995/002 (2013.01); B29K 2995/0025 (2013.01)

(56) References Cited

U.S. PATENT DOCUMENTS

| | | | | |
|---|---|---|---|---|
| 9,766,461 | B2* | 9/2017 | Riccomini | G02B 27/0172 |
| 9,851,478 | B2 | 12/2017 | Price et al. | |
| 2003/0205830 | A1* | 11/2003 | Clerc | B29C 45/16 264/1.7 |
| 2011/0059300 | A1* | 3/2011 | Kim | B32B 27/308 428/195.1 |
| 2013/0069274 | A1* | 3/2013 | Zhang | B29C 45/1671 264/279 |
| 2013/0099101 | A1 | 4/2013 | Campbell | |
| 2013/0141419 | A1 | 6/2013 | Mount et al. | |
| 2013/0265562 | A1* | 10/2013 | Tang | G01S 7/4813 356/4.01 |
| 2014/0061447 | A1 | 3/2014 | Campbell et al. | |
| 2014/0132818 | A1* | 5/2014 | Meierling | G02B 27/0006 348/335 |
| 2014/0334000 | A1* | 11/2014 | Clerc | B29D 11/0073 359/488.01 |
| 2015/0028360 | A1* | 1/2015 | Tu | H01L 25/165 257/82 |
| 2016/0292535 | A1 | 10/2016 | Thorn | |
| 2016/0313494 | A1* | 10/2016 | Hamilton | G02B 5/0294 |
| 2016/0313558 | A1 | 10/2016 | Gutierrez | |
| 2017/0134717 | A1 | 5/2017 | Trail et al. | |
| 2017/0305084 | A1* | 10/2017 | Katsumata | G02B 1/041 |
| 2018/0060700 | A1 | 3/2018 | Bleyer et al. | |
| 2018/0190838 | A1 | 7/2018 | Saxod et al. | |

FOREIGN PATENT DOCUMENTS

| | | | |
|---|---|---|---|
| CN | 103400836 A | 11/2013 | |
| EP | 2327957 A1 | 6/2011 | |
| EP | 3248044 | * 1/2015 | G02B 27/01 |
| EP | 3248044 A1 | 11/2017 | |

OTHER PUBLICATIONS

"Absorbance." Wikipedia, Wikimedia Foundation, Jul. 21, 2017, web.archive.org/web/20170721181512/en.wikipedia.org/wiki/Absorbance. (Year: 2017).*

Fabrication of Microlens Arraying Using Micro-Compression Molding with an Electroformed Mold Insert, 2003, hereinafter Moon (Year: 2003).*

Mark Mine (Towards Virtual Reality for the Masses: 10 Years of Research at Disney's VR Studio, 2003, https://dl.acm.org/doi/pdf/10.1145/769953.769955 (Year: 2003).*

Sliney, David H., et al. "The Protective Characteristics of Polycarbonate Lenses Against CO2 Laser Radiation." Journal of Laser Applications, vol. 5, No. 1, 1993, pp. 49-52., doi:10.2351/1.4745323. (Year: 1993).*

Moon, et al., "Fabrication of a Microlens Array Using Micro-Compression Molding with an Electroformed Mold Insert", In the Journal of Micromechanics and Microengineering, vol. 13, Issue No. 1, Dec. 4, 2002, pp. 98-103.

"International Search Report and Written Opinion Issued in PCT Application No. PCT/US20/017403", dated Jun. 24, 2020, 15 Pages.

* cited by examiner

INTEGRATED DEPTH SENSOR WINDOW LENS AND METHOD

CROSS-REFERENCE TO RELATED APPLICATIONS

The present application claims priority to U.S. Provisional Patent Application 62/809,537 entitled "Integrated Depth Sensor Window Lens and Method" and filed Feb. 22, 2019, which is specifically incorporated herein by reference for all that is discloses and teaches.

BACKGROUND

Augmented reality (AR) and mixed reality (MR) are technologies that provides an augmented real-world environment where the perception of a real-world environment (or data representing a real-world environment) is augmented or modified with computer-generated virtual data. For example, data representing a real-world environment may be captured in real-time using sensory input devices, such as a camera or microphone, and augmented with computer-generated virtual data, such as virtual images and virtual sounds. An AR or MR implementation may be used to enhance numerous applications including video game, mapping, navigation, and mobile device applications.

A head mounted display or head mounted device (HMD) is worn by a user to view the mixed imagery of virtual and real objects. An HMD uses a combination of optics and stereopsis to focus virtual imagery in the user's field of view. Industrial design and manufacturing challenges continue to impact HMDs, particularly as devices shrink and yet become more functional and complex. Device appearance also influences considerations.

SUMMARY

The described technology addresses such limitations by providing a head-mounted display or head mounted device (HMD).

A depth sensor window lens for an HMD can be made, in one implementation, by: injecting an optically clear polymeric material into a first mold to form a sensor lens and an illuminator lens; injecting an opaque polymeric material into a second mold subsequent to the operation of injecting an optically clear polymeric material, the second mold defining a dam between the sensor lens and the illuminator lens and forming an as-molded part; and extracting the as-molded part from the second mold, the as-molded part having a front surface of the dam within 10 nm of a front surface of the sensor lens and a front surface of the illuminator lens.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

Figure 8A:
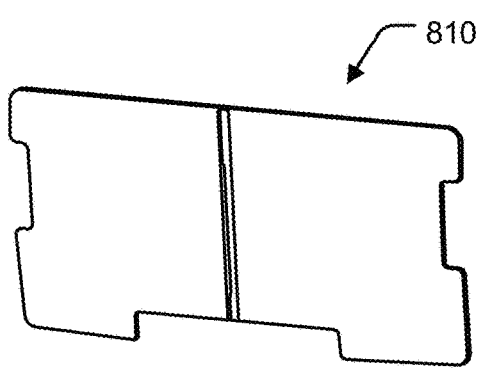
Figure 8B:
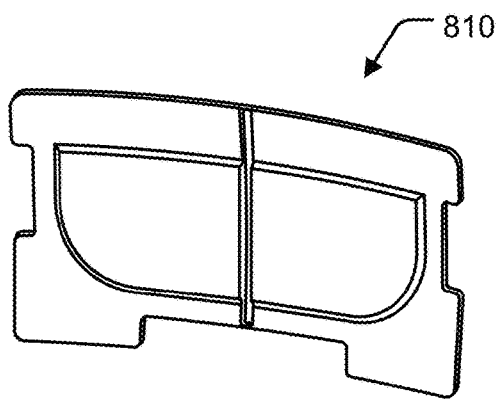
Figure 8C:
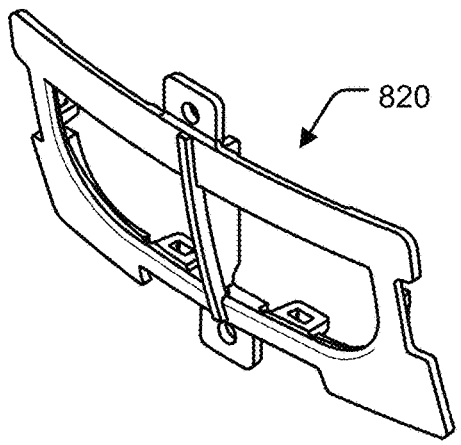
Figure 8D:
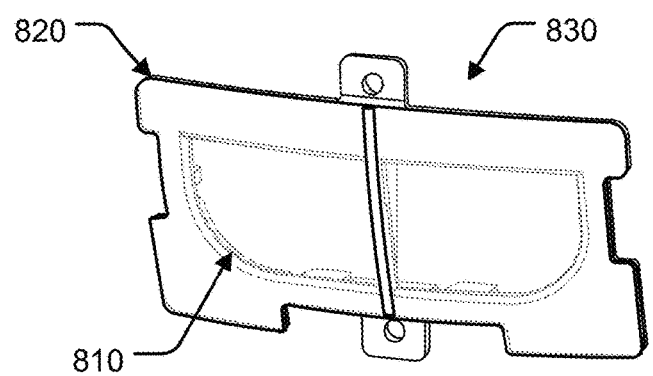
Figure 8E:
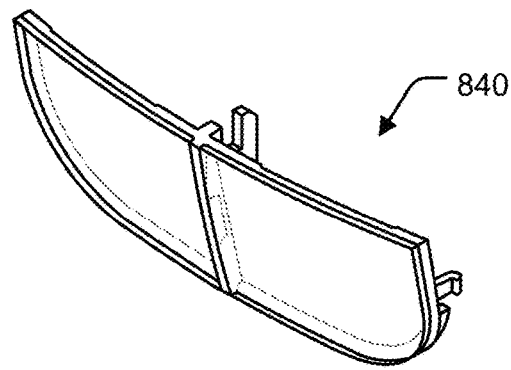

FIG. 8A is a perspective front view of the sensor and illuminator lenses formed by the first shot of a two-shot injection molding process; FIG. 8B is a perspective back view of the sensor and illuminator lenses formed by the first shot; FIG. 8C is a perspective view of a frame formed by the second shot of a two-shot injection molding process; FIG. 8D is a perspective view of the combined sensor and illuminator lenses and frame as formed by the two-shot injection molding process; FIG. 8E is a perspective view of the combined lenses and frame after machining, resulting in the depth sensor window lens.

Figure 9A:
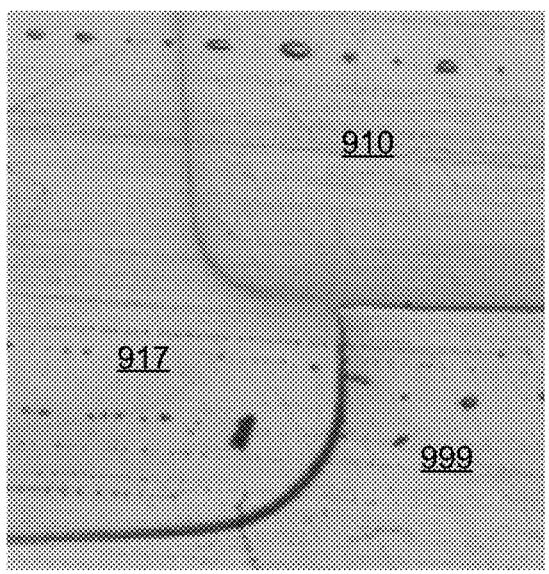
Figure 9B:
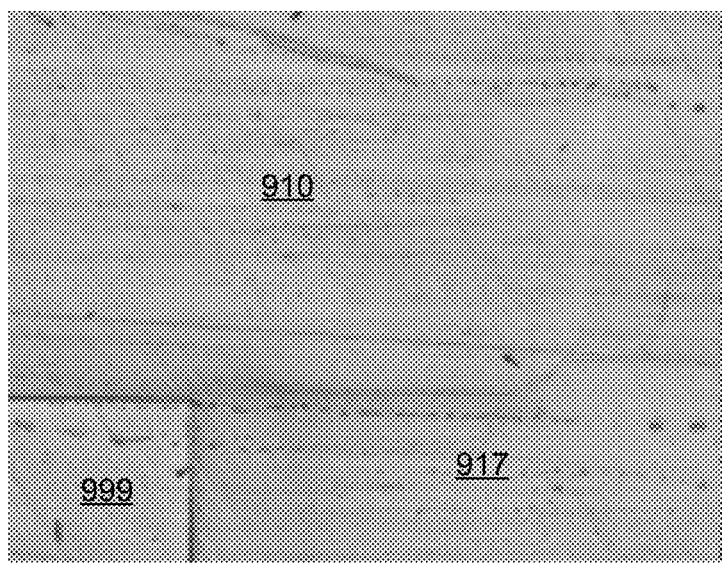
Figure 9C:
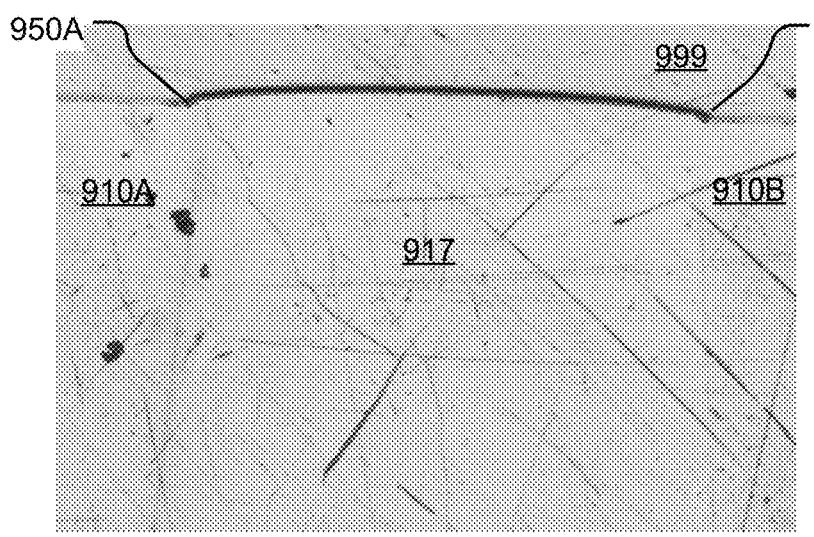

FIG. 9A is a photomicrograph of a back side of the depth sensor window lens, showing the juncture of a dam and lenses; FIG. 9B is a second photomicrograph of the back side of the depth sensor window lens, showing the juncture of the dam and lenses; FIG. 9C is a photomicrograph of the front surface of the depth sensor window lens, showing the juncture between the dam and lenses.

DETAILED DESCRIPTIONS

A head mounted display or head mounted device (HMD) for augmented reality (AR) and/or mixed reality (MR) uses a combination of optics and stereopsis to focus virtual imagery in the user's field of view. The depth sensor window lens, made by the methods disclosed herein, provides an enhanced user experience for the user using the HMD due to the depth sensor window lens and the manner in which it is constructed. The methods presented herein provide a precise, optical-quality lens that enhances the user's experience. This disclosure addresses both design and manufacturing sides for the HMD, as described below.

Particularly, described herein is a method of making a depth sensor window lens for an AR HMD or MR HMD, although the method can be used for other visual displays needing the same degree of optical preciseness.

Described herein is a method of making an optical-grade lens using two-shot injection molding. One particular method described herein includes using dual-shot or two-shot injection molding (e.g., rotational injection molding) to form the lens.

In one particular implementation, this disclosure provides a method that includes injecting an optically clear polymeric material (e.g., optically transparent and/or translucent) into a first mold to form a sensor lens and an illuminator lens; injecting an opaque polymeric material into a second mold subsequent to the operation of injecting an optically clear polymeric material, the second mold defining a dam between the sensor lens and the illuminator lens and forming an as-molded part; and extracting the as-molded part from the second mold, the as-molded part having a front surface of the dam within 10 nm of a front surface of the sensor lens and a front surface of the illuminator lens.

The disclosure also provides a depth sensor window lens comprising a sensor lens comprising an IR transparent polymer having an RMS surface finish of no more than 6 nm, an illuminator lens comprising an IR transparent polymer having an RMS surface finish of no more than 6 nm, and a dam between the sensor lens and the illuminator lens, the dam comprising an opaque polymer and having a front surface within 10 nm of a front surface of the sensor lens and a front surface of the illuminator lens. Such a depth sensor window lens may be integrated into a lens for an HMD.

This disclosure also provides an HMD having a visor; and a depth sensor window lens integrated into the visor, the depth sensor window lens including a sensor lens comprising an IR transparent polymer having an RMS surface finish of no more than 6 nm, an illuminator lens comprising an IR transparent polymer having an RMS surface finish of no more than 6 nm, and a dam between the sensor lens and the illuminator lens, the dam comprising an opaque polymer and having a front surface within 10 nm of a front surface of the sensor lens and a front surface of the illuminator lens.

Figure 1:
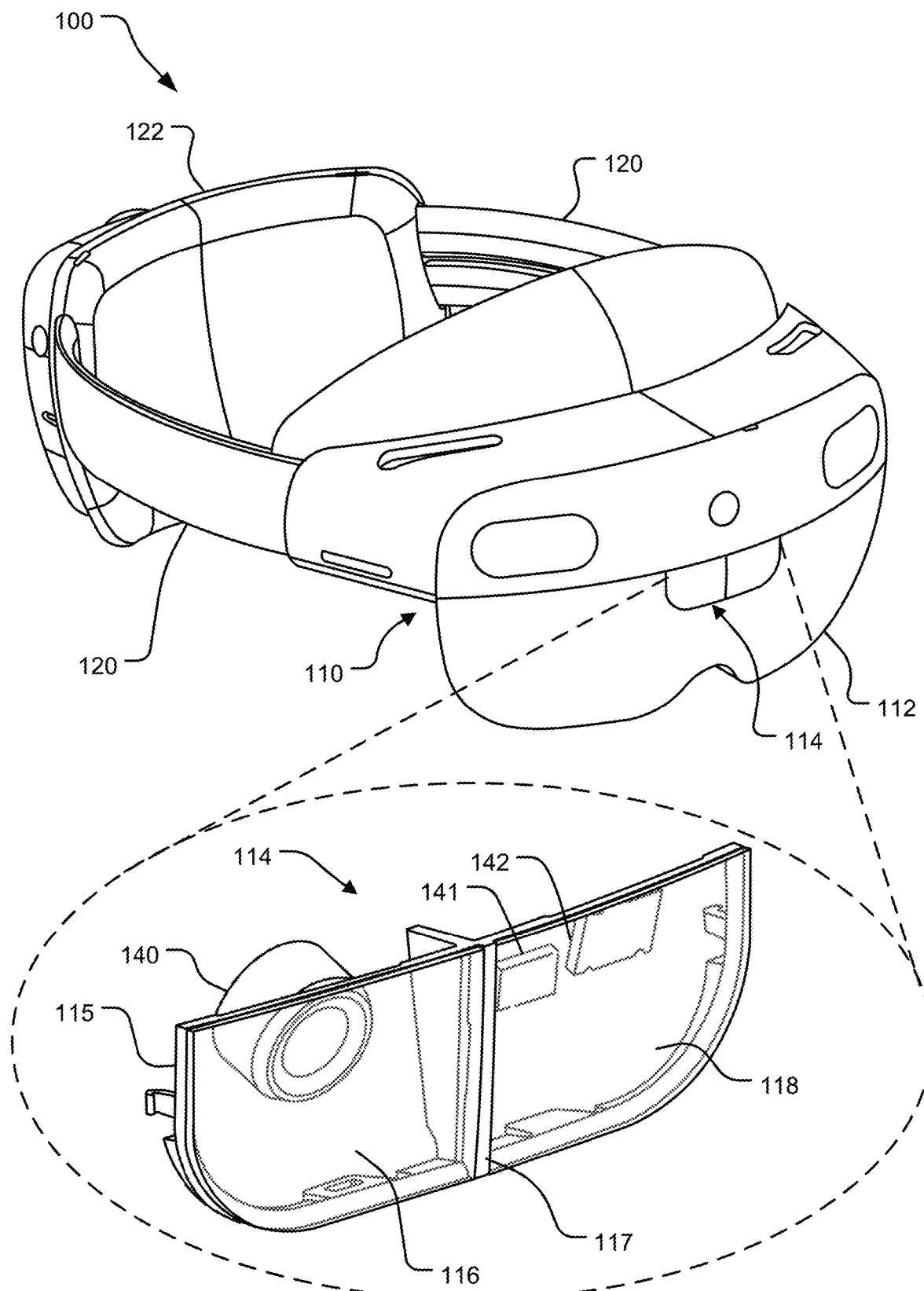
FIG. 1 is a perspective view of an example head-mounted device (HMD) with a detailed perspective view of an example depth sensor window lens.

FIG. 1 illustrates an example HMD 100 having a visor 110 that can be supported onto a user's head by a strap 120, which may include a back support 122 to increase the user's comfort. The visor 110 has a viewing area or lens 112 essentially commensurate with the user's total field of view (TFOV) while wearing the HMD 100.

In AR and/or MR applications, the HMD 100 provides a user interface to manage (e.g., activate, deactivate) applications in the HMD 100. The visor 110 includes the circuitry, processor(s), modules, electronics, etc. for the HMD 100; in some implementations, circuitry, processor(s), modules, etc., may be present in the back support 122.

In the HMD 100, the viewing area or lens 112 couples at least a portion of an optimized image to the user's focal region. Inertial, magnetic, mechanical and/or other sensors sense orientation information for the HMD and eye tracking sensors detect user eye position. A processing unit, in communication with the display, and inertial and/or other sensors and eye tracking sensors, automatically determine the total field of view (TFOV) of the user. The processing device then generates and displays a first menu including a list of one or more applications in the TFOV. The processing device receives a user selection to activate an application from the list. The processing device further generates a second menu including a list of one or more applications that are currently running in the HMD and displays the second menu in a second region of the TFOV. The second menu includes the application activated by the user. The HMD 100 of FIG. 1 satisfies the user's desire of small form factor size, a hidden sensor module, safety, working sensor angles, and industrial design needs.

For many of the applications of the HMD 100, depth sensing is paramount.

Because of this, the HMD 100 includes a time-of-flight (TOF) depth sensing sensor within the visor 110. The TOF-based depth-sensing technology uses specific wavelength IR light to illuminate the surrounding mapping areas and uses an imaging sensor to capture the IR image for depth computing. The TOF depth sensor is integrated into the visor lens 112 and is shown in FIG. 1 behind a depth sensor window lens 114. The depth sensor window lens 114 may be referred to as an integrated depth sensor window lens when present in, and part of, the visor lens 112.

The integrated depth sensor window lens 114 has two parts or halves, one lens 116 for the sensor and the other lens 118 for the illuminator which together provide depth sensing. A sensor 140 is shown behind the lens 116 and two illuminators 141, 142 are shown behind the lens 118, the two illuminators 141, 142 having opposite polarities. Although FIG. 1 has the sensor lens 116 and the sensor 140 on the right side, as viewed by a wearer of the HMD, and the illuminator lens 118 and the illuminators 141, 142 on the left side, it is understood that these may be switched.

The sensor lens 116 and the illuminator lens 118 are held by a frame 115, which in this implementation, provides a separation between the lenses 116, 118 and also encompasses the lenses 116, 118 around their periphery. The image sensing lens 116 and illuminator lens 118 are optically separated to prevent stray light caused by the illumination reflection inside the lens from disrupting proper depth sensing. In FIG. 1, the sensor lens 116 and the illuminator lens 118 are separated by an opaque dam 117 that is part of the frame 115. From an industrial design and device appearance standpoint, a seamless outline is desired. To provide a desirable product, the HMD 100 has a compact size depth sensor window lens 114, with less than 5 mm distance between the lenses 116, 118, and thus a width of the dam 117 of less than 5 mm. In some implementations, this distance is less than 2 mm, in other implementations less than 1 mm.

The depth sensor window lens 114 is configured to allow for both illuminations to shine-through and the sensor to collect light without sacrificing optical performance and device aesthetics. In accordance with this disclosure, the window lens 114 is formed by a two-shot injection molding process, the first shot forming the illuminator lens 118 and the sensor lens 116 and the second shot forming the frame 115 including the dam 117 between the illuminator lens 118 and the sensor lens 116).

Figure 2:
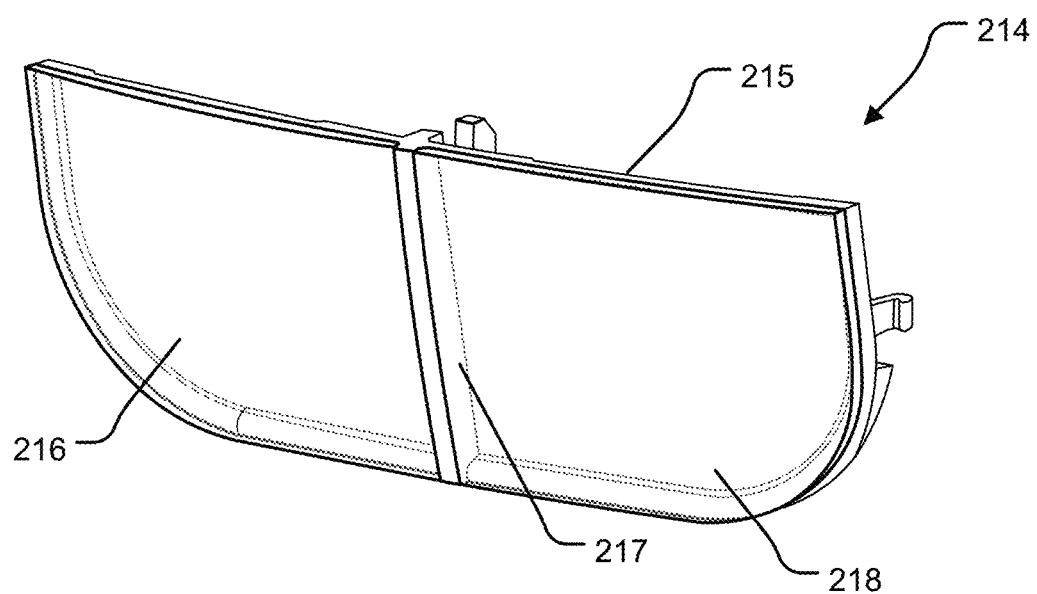
FIG. 2 is a perspective front view of an example depth sensor window lens.

FIG. 2 illustrates a depth sensor window lens 214 from a front perspective view, the window lens 214 having a sensor lens 216 and an illuminator lens 218 held in a frame 215. The frame 215 includes a frame dam 217 that seats between the sensor lens 216 and the illuminator lens 218 and optically decouples the two lenses 216, 218. The dam 217 extends from the front surface of the lenses 216, 218 to at least the back surface of the lenses 216, 218; in other words, the dam 217 has a thickness the same as or greater than the thickness of the lenses 216, 218.

In some implementations, the thickness of the sensor lens 216 and the illuminator lens 218 is 1 mm or less. In some implementations, the width of the dam 217 between the lenses 216, 218 is less than 5 mm, e.g., less than 2 mm, about 1 mm, less than 1 mm, e.g., about 0.8 mm or about 0.9 mm.

In accordance with this disclosure, the depth sensor window lens 214 is an integral, single part, having the lenses 216, 218 and the frame 215 formed via the same process. No adhesive, welding, bonding, mechanical fastener, or other mechanism is used to hold or retain the lenses 216, 218 with the frame 215; rather, the process of forming the lenses 216, 218 and the frame 215 forms the depth sensor window lens 214 as one integral part.

Figure 3:
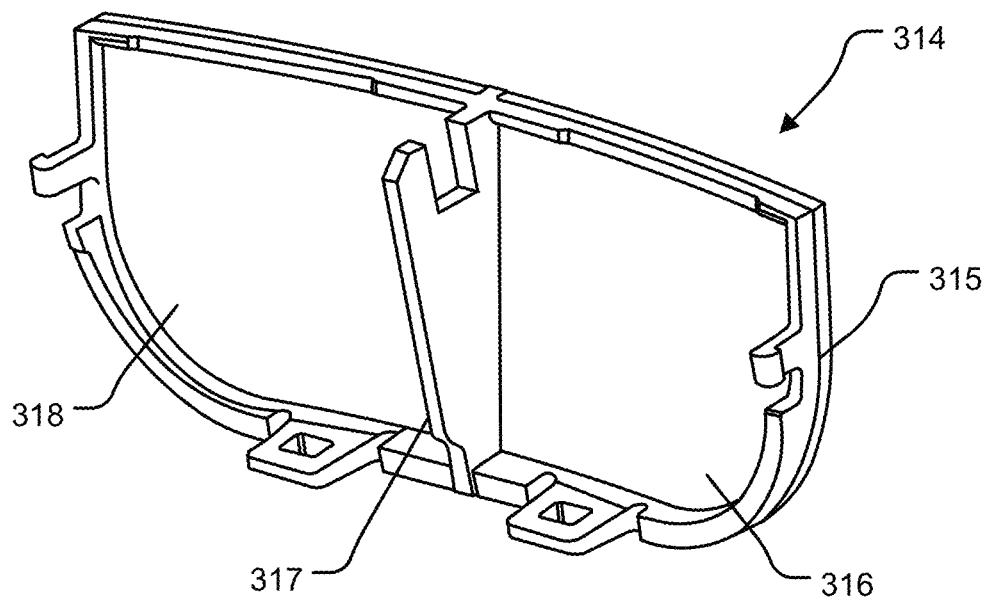
FIG. 3 is a perspective back view of an example depth sensor window lens.

FIG. 3 illustrates a depth sensor window lens 314 from a back perspective view, which is the orientation see by a user of an HMD when the window lens 314 is incorporated into the HMD. The window lens 314 has a sensor lens 316 and an illuminator lens 318 held in a frame 315. The frame 315 includes a frame dam 317 that seats between the sensor lens 316 and the illuminator lens 318 and optically decouples the two lenses 316, 318. The dam 317 extends from the front surface of the lenses 316, 318 past the back surface of the lenses 316, 318. The frame 315 also contacts the lens 316, 318 at and around their periphery, including the back surfaces of the lenses 316, 318 proximate their peripheries.

Various features of the depth sensor window lens 314 and its elements not detailed here may be the same as or similar to details provided for other implementations described herein.

Figure 4:
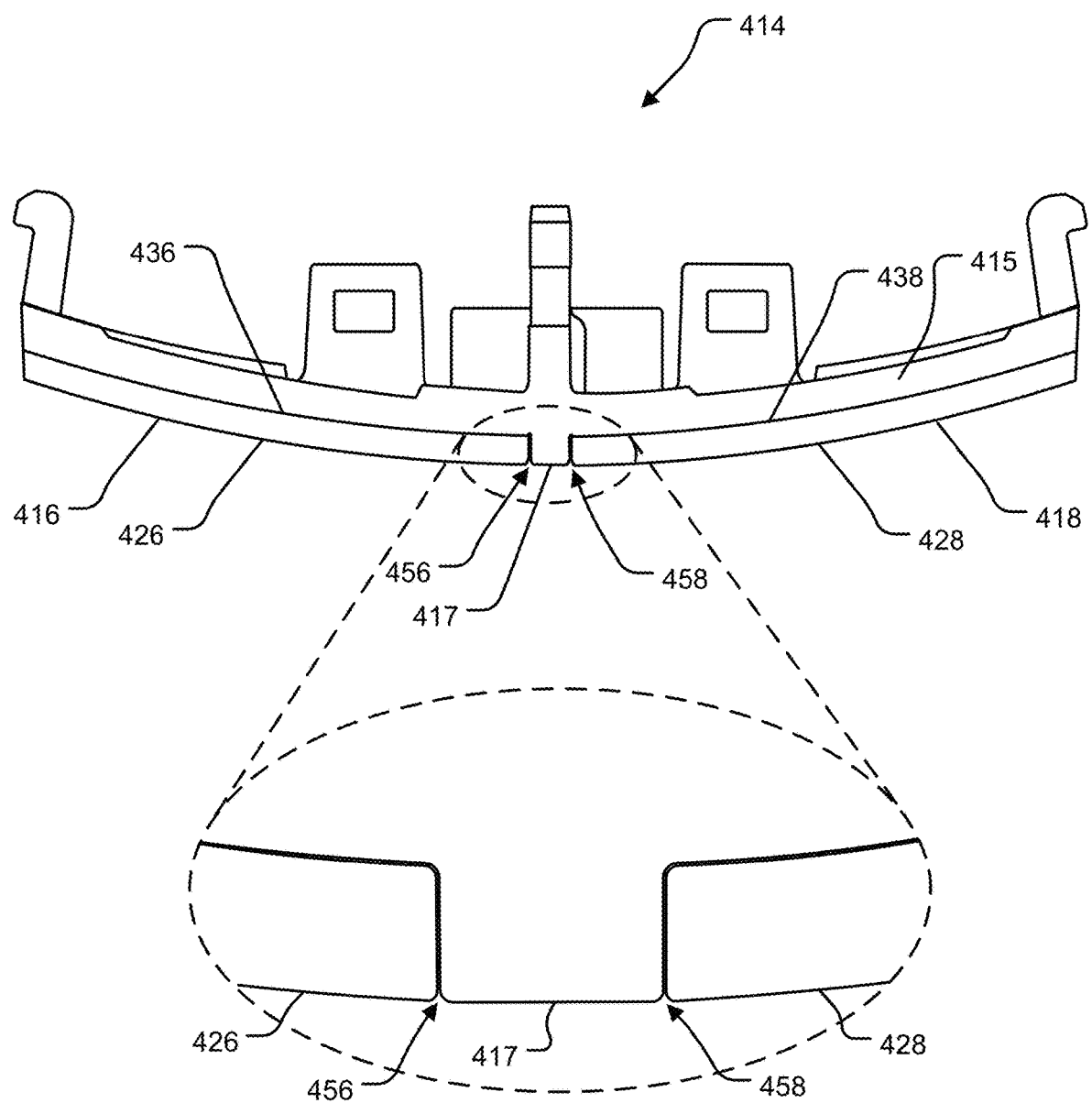
FIG. 4 is a top view of an example depth sensor window lens.

FIG. 4 is a top view of a depth sensor window lens 414 having a sensor lens 416 and an illuminator lens 418 held in a frame 415. The frame 415 includes a frame dam 417 that seats between the sensor lens 416 and the illuminator lens 418 and optically decouples the two lenses 416, 418. The dam 417 extends from a front surface 426 of the sensor lens 416 to and past a back surface 436, and from a front surface 428 of the illuminator lens 418 to and past a back surface 438. Although not readily apparent in FIG. 4, the frame 415 engaged with the lens 416, 418 at the dam 417 and around the periphery of the lenses 416, 418 on the back surfaces 436, 438.

The dam 417 is substantially flush with the front surfaces 426, 428 of the lenses 416, 418, within no more than 10 nm, in some implementations, no more than 8 nm, or 6 nm. In FIG. 4, the front surface 426 of the lens 416 meets the dam 417 at a valley 456, and the front surface 428 of the lens 418 meets the dam 417 at a valley 458. These valleys 456, 458 are no than 10 nm deep, 8 nm deep, or 6 nm deep, and are no than 10 nm wide, 8 nm wide, or 6 nm wide. In some implementations, the width of the dam 417, measured between the lenses 416, 418, is less than 5 mm, e.g., less than 2 mm, about 1 mm, less than 1 mm, e.g., about 0.8 mm or about 0.9 mm.

In some implementations, the thickness of the lenses 416, 418, from the front surface 426, 428 to the back surface 436, 438 is 1 mm or less.

Various features of the depth sensor window lens 414 and its elements not detailed here may be the same as or similar to details provided for other implementations described herein. It is noted that the particular configuration of the back side of the frame 415 is for attaching or installing the depth sensor window lens 414 in an HMD visor, such as visor 110 of FIG. 1.

Figure 5:
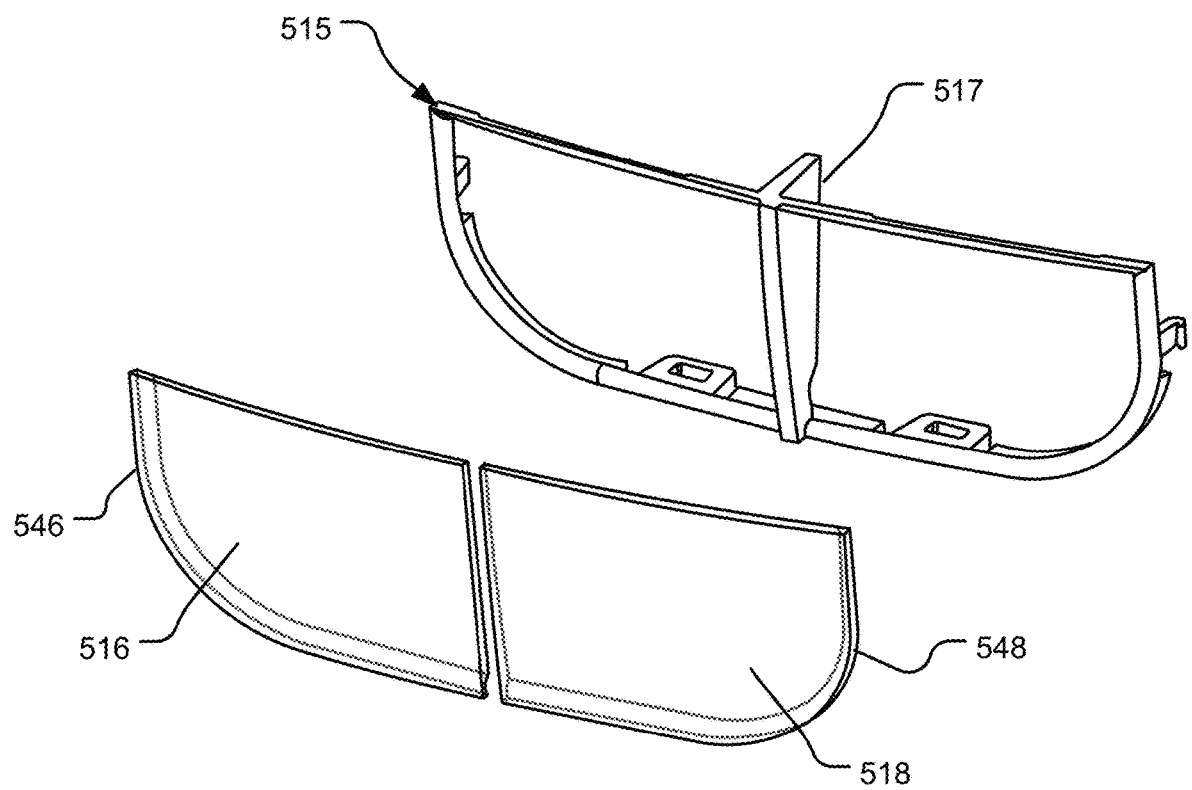
FIG. 5 is a perspective exploded view of an example depth sensor window lens.

FIG. 5 is an exploded view of a depth sensor window lens, with a sensor lens 516 and an illuminator lens 518 removed from and separated from a frame 515, which has a dam 517 shaped and sized to seat between the lenses 516, 518 when the frame 515 and lenses 516, 518 are combined. Additionally, the frame 515 contacts the lenses 516, 518 at their respectively peripheries 546, 548 and on their back surfaces proximate the peripheries 546, 548.

Various features of the depth sensor window lens, the sensor lens 516, the illuminator lens 518 and their elements not detailed here may be the same as or similar to details provided for other implementations described herein.

As indicated above, this disclosure addresses both the design and manufacturing perspectives for the depth sensor window lens, e.g., the integrated depth sensor window lens.

From the design perspective, while both the sensor and the illuminator have their own optically clear lens, they are joined together to form a single part with an optical isolated (e.g., opaque) barrier or dam between the two lenses to prevent the light from leaking and reflecting to the adjacent chamber. The lenses are optically clear, IR plastic (polymeric) lenses that can pass the specific wavelength light which the depth module operates. The opaque dam in the middle has high opaqueness (e.g., an optical density greater than 4). The combination of the three individual pieces (two lenses and one frame) forms a single, integral part that has the desired characteristics: mirror polished surface finish for at least the lenses, the seamless joint line, the optically clear IR lenses and the opaque middle frame. In some implementations, both the lenses and the frame are visually black in color.

In the field of injection molding manufacturing, single operation double-shot injection molding has been used on many products, such as keyboard buttons. However, use of an optically graded, mirror polish surface finish on double-shot parts, to achieve a seamless appearance, has yet to be implemented in optical devices such as HMDs. One of the challenges is that the valley at a joint boundary or juncture during a double-shot process can be much deeper than an optical grade mirror polish (e.g., <6 nm surface roughness (Ra)). Thus, the juncture is usually noticeable, which affects the aesthetic aspect of the product. If the process is not managed right, any deep valley at the juncture (e.g., greater than about 10 nm) can cause unexpected stray light from the ambient world to affect the depth measurement.

In accordance with this disclosure, to achieve a shallow, less noticeable valley (e.g., less than 10 nm, or less than 8 nm, or even less than 6 nm deep, and optionally less than 10 nm, or 8 nm, or 6 nm wide) between the lenses and the dam, the tooling tolerance for the first and second shot are extremely tight, e.g., within 10 nm, so that when the tool (mold) closes, material can flow through and fully fill the juncture where the second shot meets the first shot, thus inhibiting any valley. The injection process is also precisely controlled so the second shot molding material can fully fill the juncture region, from the front surfaces of the first shot to the back surfaces, while inhibiting the formation of voids and melting or softening of the first shot material.

An example overall processes for producing a depth sensor window lens (which includes the two optically clear lenses having a mirror finish—for the sensor and the illuminator—and the frame that includes an optically opaque dam separating the sensor lens and the illuminator lens) includes the following steps. First, appropriate tooling (mold) is obtained for the two lenses (first shot) and the frame (second shot). The tooling is shaped and sized to tight tolerance in order to obtain the eventual product. The tooling may be formed, e.g., of nickel, stainless steel (e.g., Stavex™ stainless steel) or a combination thereof; the tooling may be, e.g., stainless steel with a nickel coating. In some implementations, the tooling may have a mirror polish surface finish. The tooling is used in a double-shot injection molding process, which may be done in a cleanroom (e.g., 10K class cleanroom). The resulting piece has an RMS surface roughness of less than 6 nm. The piece is quality checked, and then coated with at least one protective coating (e.g., 10K class cleanroom) to provide a coated piece with a UV/VIS transmission of $T_{max}$<1% and $T_{avg}$<0.5% and an NIR transmission of: $T_{avg}$>94% at 0 degree angle of incidence, $T_{avg}$>90% at 40 degree angle of incidence, $T_{avg}$>68% at a 70 degree angle of incidence, $T_{min}$>92% at a 0 degree angle of incidence, $T_{min}$>88% at a 40 degree angle of incidence, and $T_{min}$>66% at a 70 degree angle of incidence, as determined by a subsequent quality check. Upon approval, the piece is machined (e.g., using a Beijing Carver CNC machine, and/or in a 10K class cleanroom) to a tolerance of ±0.05 mm. After another quality check, which may be or include a visual cosmetic inspection, the piece is packaged (e.g., in a plastic turnover tray) for eventual installation into an HMD, e.g., at the same facility or by another party.

Figure 6:
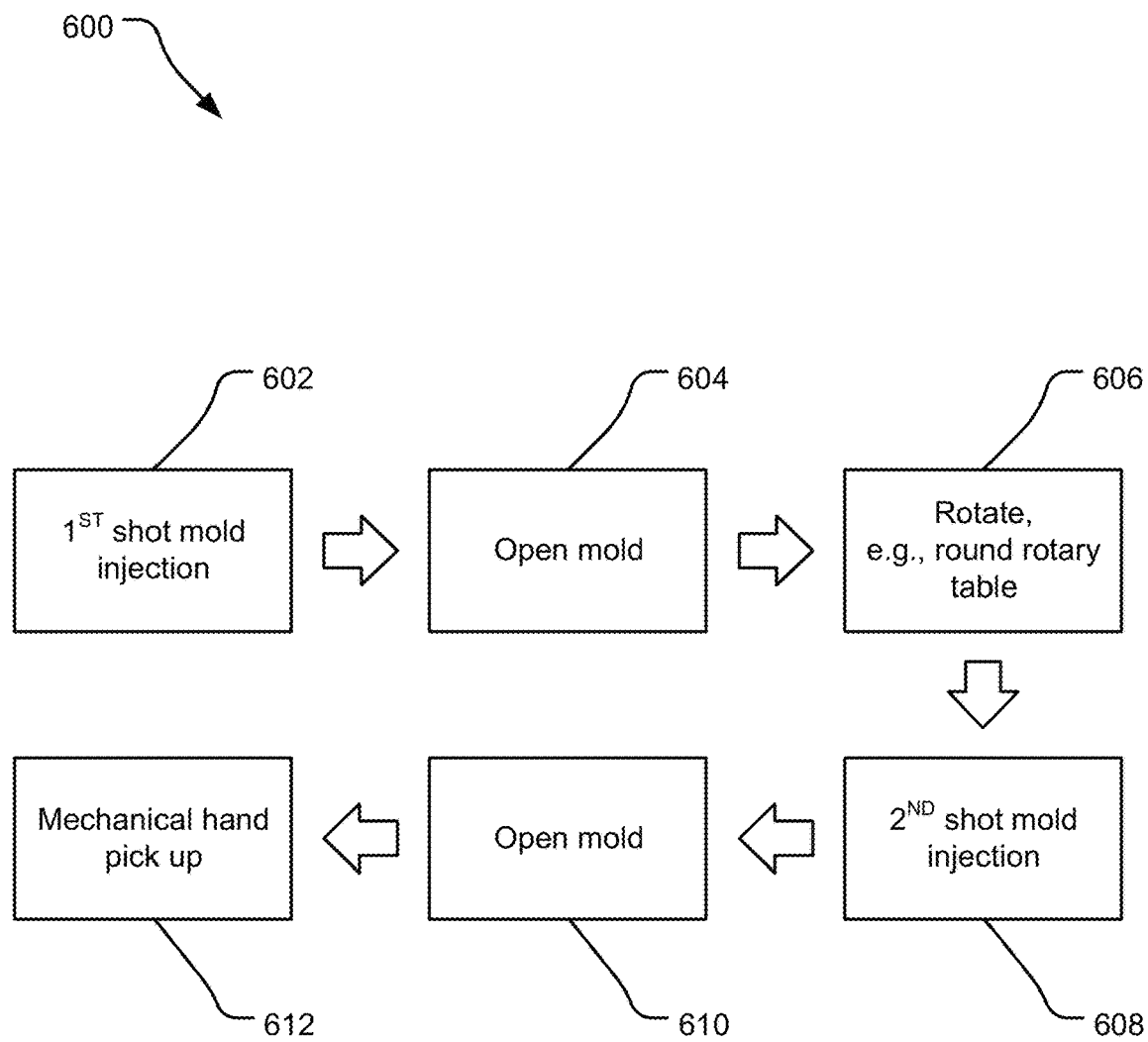
FIG. 6 is a flow chart showing an example process for making an example depth sensor window lens.

As indicated above, the process utilizes a double-shot, two-shot or dual-shot injection molding process. FIG. 6 shows a stepwise process 600 for forming a depth sensor window lens using a double-shot injection molding method.

The process 600 includes a first injection operation 602 where the first shot is molded in a first mold; the first mold may have a mirror quality surface finish. The injection operation 602 includes injecting a first polymeric material, e.g., IR transparent, into the first mold to form the lenses for the illuminator and the sensor. At an opening operation 604, the first mold is opened, and at least a part of the mold is removed from the formed lenses. At a rotating operation 606, the molded part is rotated, e.g., on a rotary table, to the location of a second mold. A second injection operation 608, the second mold is used for molding a second shot of polymeric material, e.g., opaque material, for forming the frame around the lenses; the second mold may have a mirror quality surface finish. This second shot may occur within, e.g., 30 seconds, 20 seconds, 15 seconds, or even 10 seconds after the first shot. This second shot inherently adheres to the first part (lenses) during the process, so that no additional fastening or connecting mechanism is added between the parts. The first shot may or may not be completely cured or polymerized when the second shot is injected. In another opening operation 610, the second mold is opened, and the twice-molded part is removed from the second mold in a picking operation 612, e.g., by a mechanical hand. At this stage, the twice-molded part, particularly the lenses formed by the first shot, have a mirror-quality finish, and/or an RMS surface roughness of less than 6 nm.

It is noted that the process 600, in one implementation, includes two different cavities (molds) that utilize the same cores on a rotary table. This allows a process where both the first shot and the second shot are working simultaneously; that is, while the first shot is injecting into the first mold, the second shot is injecting into the second mold. After these processes, the rotary table rotates, moving the cores in position for the next shots.

Figure 7:
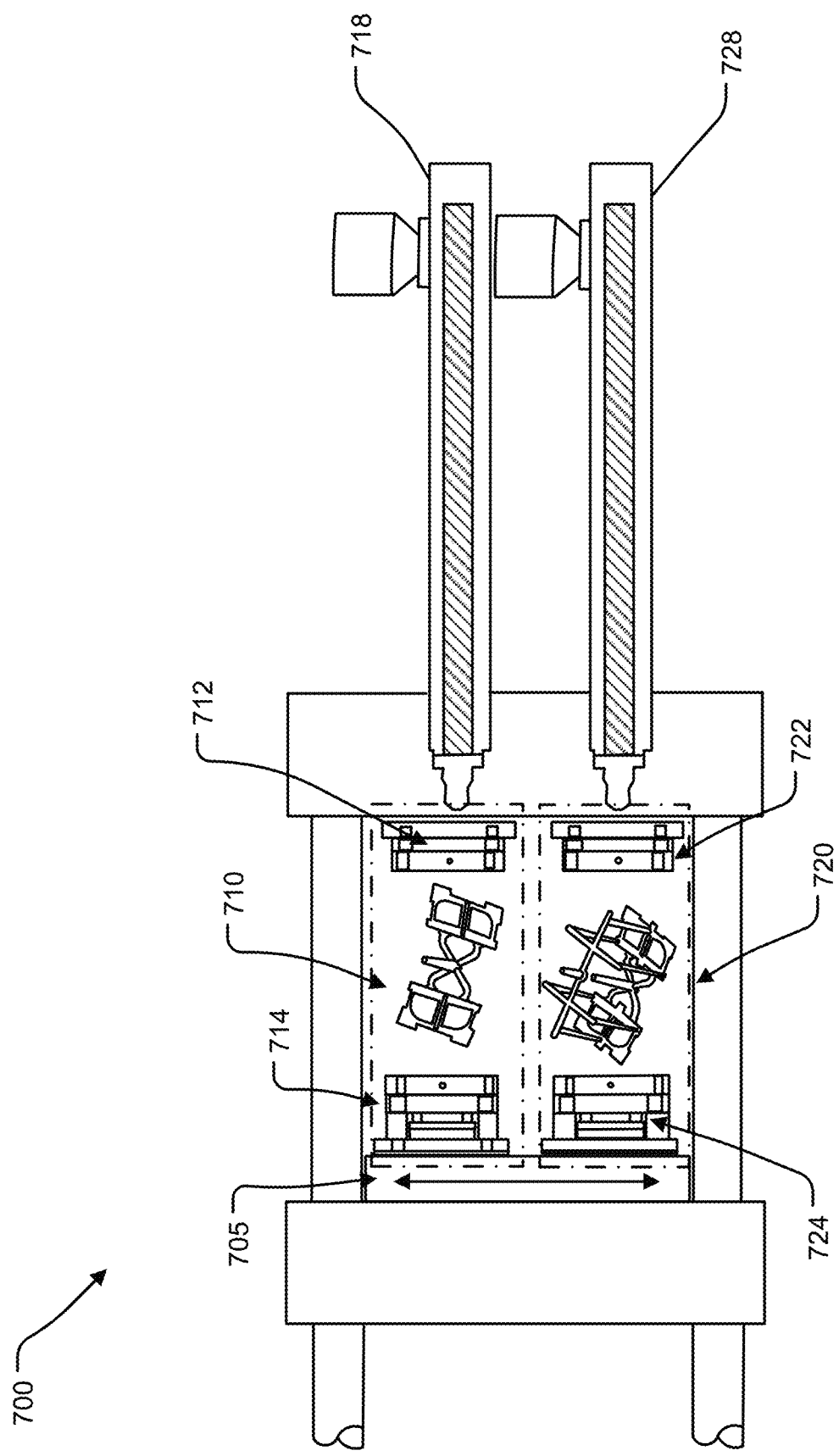
FIG. 7 is a schematic diagram of a two-shot rotary injection molding machine.

FIG. 7 illustrates an example rotary injection molding machine 700 suitable for implementing the process 600. The injection molding machine 700 has a rotary table 705 and a first mold 710 and a second mold 720, the first mold 710 including a first cavity 712 and a first core 714 and the second mold 720 including a second cavity 722 and a second core 724. The first mold 710 receives the first shot of material (to form the lenses) and the second mold 720 receives the second shot of material (to form the frame). Each or either of the molds 710, 720 may have a mirror finish. In FIG. 7, two sets of lenses are formed via the first mold 710, and two frames are formed via the second mold 720, one frame for each set of lenses.

A first screw 718, operably connected to an extruder, provides the material to the first mold 710 and a second screw 728, operably connected to an extruder, provides the material to the second mold 720.

The injection molding machine 700 is configured to have both the first mold 710 and the second mold 720 to operate simultaneously; that is, both the first shot of material and the second shot of material are injected at the same time.

In one particular implementation of the molding processes, the parameters are as follows:

Lens (1st shot) material: Trinseo Emerge PC 4310-15 IR Transparent
  Color: IC1600059; Black in visual color, transparent in IR
  Sample properties: superior flow for lens molding; good optical properties/transmissivity; good abrasion resistance
  Molding temperature: 305° C.
Frame (2nd shot) material: Trinseo Emerge PC 4310-22 IR Opaque
  Color: IC77000367; Black in visual color and in IR
  Sample properties: high optical isolation properties (OD-4); high toughness and flexural strength for the snap features; superior flow for fine features molding
  Molding temperature: 280° C.

For both the first shot and the second shot of the polymeric material, the viscosity of the polymeric material during the injection molding is dependent on the polymeric material itself, the molding temperature, and the mold configuration. For example, for the first shot (lenses), at a molding temperature of 300° C. the viscosity is about 350 Pa-s, at about 315° C. the viscosity is about 200 Pa-s, at about 330° C. the viscosity is about 120 Pa-s, and at about 340° C. the viscosity is less than 100 Pa-s. As another example, for the second shot (frame), at a molding temperature of 270° C. the viscosity is about 500 Pa-s, at about 280° C. the viscosity is about 400 Pa-s, at about 290° C. the viscosity is about 300 Pa-s, and at about 340° C. the viscosity is about 200 Pa-s.

It is noted that polymeric materials other than polycarbonate may be used for the lens and/or the frame. The material selection should be made taking into consideration molding capabilities, optical properties, and compatibility between the materials of the two shots.

Typically, the material for the lenses (for the sensor and illuminator) is IR transparent and optionally optically clear polycarbonate, although other IR transparent and optionally optically clear polymeric materials could be used. The lens material can be any amorphous thermoplastic material that is IR transparent and/or translucent, at least at wavelengths of 750 nm-1000 nm. Examples of suitable materials include polycarbonate (PC), acrylonitrile butadiene styrene (ABS), polystyrene (PS), polyethylene (PE), polylactic acid (PLA), polymethyl methacrylate (PMMA), any of various acrylics or polyamides (e.g., "Nylon"), and any mixtures and/or blends thereof. The polymeric material may be 100% solids or may include a solvent. It is understood that adjuvants such as fillers, initiators, processing aids, pigments, etc. could be present in the polymeric material.

The material for the frame should have good opaque properties (e.g., OD4+), particularly for IR radiation. Because the frame is the second shot in the molding process, the material should have an equivalent or lower molding temperature than the lens material (first shot). The material also should have good bonding strength with the first shot material, so that no adhesives or other fastening or bonding mechanisms are used to retain the frame to the lenses. Similar to the lenses, examples of suitable materials for the frame include polycarbonate (PC), acrylonitrile butadiene styrene (ABS), polystyrene (PS), polyethylene (PE), polylactic acid (PLA), polymethyl methacrylate (PMMA), any of various acrylics or polyamides (e.g., "Nylon"), and any mixtures and/or blends thereof. The frame material may be colored any color. The polymeric material may be 100% solids or may include a solvent. It is understood that adjuvants such as fillers, initiators, processing aids, pigments, etc. could be present in the polymeric material.

FIGS. 8A through 8E show an example depth sensor window lens at various stages in the manufacturing process. In FIGS. 8A and 8B, the result of the first shot is shown as a part 810, in front view (FIG. 8A) and back view (FIG. 8B); this part 810 will eventually be the lenses, and in some implementations is formed by two discrete, unconnected parts. FIG. 8C shows the second shot, alone, as an as-molded frame 820. However, according to the method described herein, the second shot is injected directed onto and around the first part 810, forming the resulting as-molded part 830 of FIG. 8D, having both the part 810 and the as-molded frame 820. The as-molded part 830 can be coated with a protective hard coat on either or both the front and back side. After machining, trimming or other post-processing of the as-molded part 830 to remove extraneous material (e.g., with a CNC machine), either before or after any protecting hard coat, the final product is shown in FIG. 8E as a depth sensor window lens 840. This depth sensor window lens 840 can then be installed in an HMD, forming an integrated depth sensor window lens.

An example summary of the optical requirements for the finished part (lens+frame) are provided in Table 1 and in Table 2. Table 2 provides properties for when polycarbonate is used for the lenses (first shot).

TABLE 1

| PARAMETER | REQUIRE-MENT | COMMENT |
| --- | --- | --- |
| Haze | <1% | more than 1% scatter is unacceptable |
| Scratch/dig | 20/10 | According to MIL-13830B spec; scratches to not exceed 20 µm width, digs not to exceed 10 µm diameter |
| Bubbles/inclusions | 3 × 0.01 mm | Up to 3 bubbles/inclusion up to 10 µm in size |
| Surface roughness | 6 nm RMS | Across entire aperture |
| Surface error | <λ/4 | Across entire aperture (λ = 850 nm) |
| Cracks/chips/dust/fingerprints/glue/dirt/stains | None acceptable | |

TABLE 2

| PARAMETER | TRANSMISSION REQUIREMENT | AT WAVELENGTH | COMMENT |
| --- | --- | --- | --- |
| UV/VIS transmission (inner/outer surface) | $T_{max} < 1\%$ $T_{avg} < 0.5\%$ | 300-800 nm | For AOI* ranging from 0-30 degrees (unpolarized light) |
| NIR transmission (inner/outer surface) | $T_{avg} > 94\%$ $T_{min} > 90\%$ | 840-890 nm | For AOI* ranging from 0-30 degrees (unpolarized light) |
| NIR transmission (inner/outer surface) | $T_{max} < 1\%$ $T_{avg} < 0.5\%$ | 930-1100 nm | For AOI* ranging from 0-30 degrees (unpolarized light) |
| Coatings | Front surface: anti-reflecting coating + anti-scratch hard coat Back surface: anti-reflecting coating + anti-scratch hard coat | | |

*angle of incidence

FIGS. 9A through 9C are photomicrographs under a high resolution microscope of an example depth sensor window lens formed by a double-shot injection molding technique according to this disclosure using polycarbonate. FIGS. 9A and 9B show the two-shot boundary on the back side of the part near the dam. Particularly, in FIGS. 9A and 9B, two different views of a juncture of a lens 910 with a dam 917 are seen, this juncture being on the back surface of the lens 910, proximate the periphery of the lens 910. The region labeled 999 is not a feature of the depth sensor window lens but is the microscope support surface.

FIG. 9C shows the double-shot boundary on the front side. Particularly, in FIG. 9C the juncture of a first lens 910A and a second lens 910B with the dam 917 is seen as a "top-down" view along the front of the lenses 910A, 910B and the dam 917, similar to the view of FIG. 4. The juncture of the first lens 910A and the dam 917 forms a first valley 950A and the juncture of the second lens 910B, and the dam 917 forms a second valley 950B. The region labeled 999 is not a feature of the depth sensor window lens but is the microscope support surface.

As seen in FIG. 9C, even though using the two shot injection molding method of this disclosure, an identifiable, very shallow valley or valleys may exist at the juncture of the lenses and the dam. However, with an anti-reflection coating applied to the lenses and optionally to the dam, the junctures are not noticeable by naked eyes in the final product. Further, a black color to the dam and the lenses further masks the juncture valleys.

An example method includes injecting an optically clear polymeric material into a first mold to form a sensor lens and an illuminator lens, and injecting an opaque polymeric material into a second mold subsequent to the operation of injecting an optically clear polymeric material, the second mold defining a dam between the sensor lens and the illuminator lens and forming an as-molded part. The method also includes extracting the as-molded part from the second mold, the as-molded part having a front surface of the dam within 10 nm of a front surface of the sensor lens and a front surface of the illuminator lens.

Another example method, of any preceding method, uses a two-shot injection molding process.

Another example method, of any preceding method, is provided wherein the optically clear polymeric material includes IR transparent polycarbonate.

Another example method, of any preceding method, is provided wherein the opaque polymeric material includes polycarbonate. The opaque polymeric material may include polycarbonate having an optical density greater than 4.

Another example method, of any preceding method, is provided wherein the opaque polymeric material includes polycarbonate and a second polymer.

Another example method, of any preceding method, is provided wherein the opaque polymeric material is black.

Another example method, of any preceding method, is provided wherein the optically clear polymeric material is translucent black.

Another example method, of any preceding method, is provided wherein the front surface of the sensor lens and the front surface of the illuminator lens have an RMS surface finish of no more than 6 nm.

Another example method, of any preceding method, is provided wherein each of the first mold and the second mold have a mirror surface finish.

Another example method, of any preceding method, further includes applying a hard coat coating to the sensor lens and the illuminator lens.

Another example method, of any preceding method, further includes trimming the as-molded part to form a depth sensor window lens.

An example depth sensor window lens includes a sensor lens including an IR transparent polymer having an RMS surface finish of no more than 6 nm, an illuminator lens including an IR transparent polymer having an RMS surface finish of no more than 6 nm, and a dam between the sensor lens and the illuminator lens. The dam includes an opaque polymer and has a front surface within 10 nm of a front surface of the sensor lens and a front surface of the illuminator lens.

Another example depth sensor window lens, of any preceding window lens, is provided wherein the dam has a width between the lenses of 1 mm or less.

Another example depth sensor window lens, of any preceding window lens, is provided wherein the front surface of the dam is within 6 nm of the front surface of the sensor lens and the front surface of the illuminator lens.

Another example depth sensor window lens, of any preceding window lens, is provided wherein the sensor lens and the illuminator lens include IR transparent polycarbonate, and the dam includes polycarbonate having an optical density greater than 4.

Another example depth sensor window lens, of any preceding window lens, further includes a frame in contact with a periphery of the sensor lens and a periphery of the illuminator lens, the frame including the dam. The frame may contact a back surface of the sensor lens proximate the periphery and a back surface of the illuminator lens proximate the periphery.

An example head mounted device (HMD) for augmented reality (AR) or mixed reality (MR) includes a visor lens and a depth sensor window lens integrated into the visor lens. The depth sensor window lens includes a sensor lens including an IR transparent polymer having an RMS surface finish of no more than 6 nm. The depth sensor window lens also includes an illuminator lens comprising an IR transparent polymer having an RMS surface finish of no more than 6 nm. A dam is between the sensor lens and the illuminator lens, the dam including an opaque polymer and having a front surface within 10 nm of a front surface of the sensor lens and a front surface of the illuminator lens.

Another example depth sensor window lens, of any preceding window lens, further includes a frame in contact with a periphery of the sensor lens and a periphery of the illuminator lens, the frame including the dam.

An example system includes means for injecting an optically clear polymeric material into a first mold to form a sensor lens and an illuminator lens, and means for injecting an opaque polymeric material into a second mold subsequent to the operation of injecting an optically clear polymeric material, the second mold defining a dam between the sensor lens and the illuminator lens and forming an as-molded part. The system also includes means for extracting the as-molded part from the second mold, the as-molded part having a front surface of the dam within 10 nm of a front surface of the sensor lens and a front surface of the illuminator lens.

Another example system, of any preceding system, uses a two-shot injection molding process.

Another example system, of any preceding system, is provided wherein the optically clear polymeric material includes IR transparent polycarbonate.

Another example system, of any preceding method, is provided wherein the opaque polymeric material includes polycarbonate. The opaque polymeric material may include polycarbonate having an optical density greater than 4.

Another example system, of any preceding system, is provided wherein the opaque polymeric material includes polycarbonate and a second polymer.

Another example system, of any preceding system, is provided wherein the opaque polymeric material is black.

Another example system, of any preceding system, is provided wherein the optically clear polymeric material is translucent black.

Another example system, of any preceding system, is provided wherein the front surface of the sensor lens and the front surface of the illuminator lens have an RMS surface finish of no more than 6 nm.

Another example system, of any preceding system, is provided wherein each of the first mold and the second mold have a mirror surface finish.

Another example system, of any preceding system, further includes a means of applying a hard coat coating to the sensor lens and the illuminator lens.

Another example system, of any preceding system, further includes a means of trimming the as-molded part to form a depth sensor window lens.

The above specification and examples provide a complete description of the process and use of example implementations of the invention. The above description provides specific implementations. It is to be understood that other implementations are contemplated and may be made without departing from the scope or spirit of the present disclosure. The above-detailed description, therefore, is not to be taken in a limiting sense. While the present disclosure is not so limited, an appreciation of various aspects of the disclosure will be gained through a discussion of the examples provided.

Unless otherwise indicated, all numbers expressing feature sizes, amounts, and physical properties are to be understood as being modified by the term "about." Accordingly, unless indicated to the contrary, the numerical parameters set forth are approximations that can vary depending upon the desired properties sought to be obtained by those skilled in the art utilizing the teachings disclosed herein.

As used herein, the singular forms "a," "an," and "the" encompass implementations having plural referents, unless the content clearly dictates otherwise. As used in this specification and the appended claims, the term "or" is generally employed in its sense including "and/or" unless the content clearly dictates otherwise.

Spatially related terms, including but not limited to, "lower," "upper," "beneath," "below," "above," "on top," etc., if used herein, are utilized for ease of description to describe spatial relationships of an element(s) to another. Such spatially related terms encompass different orientations of the device in addition to the particular orientations depicted in the figures and described herein. For example, if a structure depicted in the figures is turned over or flipped over, portions previously described as below or beneath other elements would then be above or over those other elements.

Since many implementations of the invention can be made without departing from the spirit and scope of the invention, the invention resides in the claims hereinafter appended. Furthermore, structural features of the different implementations may be combined in yet another implementation without departing from the recited claims.

What is claimed is:

1. A method comprising:
   injecting an optically clear polymeric material into a first mold to form a sensor lens and an illuminator lens;
   moving the sensor lens and the illuminator lens from at least a portion of the first mold to a second mold;
   injecting an opaque polymeric material into the second mold having the sensor lens and the illuminator lens therein, the second mold defining a dam between the sensor lens and the illuminator lens, and forming an as-molded part; and extracting the as-molded part from the second mold, the as-molded part having a front surface of the dam within 10 nm of a front surface of the sensor lens and a front surface of the illuminator lens.

2. The method of claim 1, using a two-shot injection molding process.

3. The method of claim 1, wherein the optically clear polymeric material comprises IR transparent polycarbonate.

4. The method of claim 1, wherein the opaque polymeric material comprises polycarbonate.

5. The method of claim 4, wherein the opaque polymeric material comprises polycarbonate having an absorbance of at least 99.99% for infrared radiation.

6. The method of claim 1, wherein the opaque polymeric material comprises polycarbonate and a second polymer.

7. The method of claim 1, wherein the opaque polymeric material is black.

8. The method of claim 1, wherein the optically clear polymeric material is translucent black.

9. The method of claim 1, wherein the front surface of the sensor lens and the front surface of the illuminator lens have an RMS surface finish of no more than 6 nm.

10. The method of claim 1, wherein each of the first mold and the second mold have a mirror surface finish.

11. The method of claim 1, further comprising:

applying a hard coat coating to the sensor lens and the illuminator lens.

12. The method of claim 1, further comprising:

trimming the as-molded part to form a depth sensor window lens.

* * * * *